США010914825B2

(12) United States Patent
Coda (10) Patent No.: US 10,914,825 B2
(45) Date of Patent: Feb. 9, 2021

(54) TECHNIQUE FOR REDUCING IMPACT OF BACKSCATTER IN COHERENT LASER DETECTION AND RANGING (LADAR) SYSTEMS

(71) Applicant: Raytheon Company, Waltham, MA (US)

(72) Inventor: Robert J. Coda, Torrance, CA (US)

(73) Assignee: Raytheon Company, Waltham, MA (US)

(*) Notice: Subject to any disclaimer, the term of this patent is extended or adjusted under 35 U.S.C. 154(b) by 48 days.

(21) Appl. No.: 16/355,346

(22) Filed: Mar. 15, 2019

(65) Prior Publication Data

US 2020/0292680 A1 Sep. 17, 2020

(51) Int. Cl.
*G01S 7/4911* (2020.01)
*G01S 17/34* (2020.01)

(52) U.S. Cl.
CPC ............. *G01S 7/4911* (2013.01); *G01S 17/34* (2020.01)

(58) Field of Classification Search
CPC ...... G01S 7/4911; G01S 7/4917; G01S 7/193; G01S 17/34; G01S 17/42
See application file for complete search history.

(56) References Cited

U.S. PATENT DOCUMENTS

| 5,151,747 A * | 9/1992 | Nourrcier | G01S 17/32 356/28.5 |
| 5,164,948 A * | 11/1992 | Nettleton | H04B 10/60 356/28.5 |
| 2002/0075472 A1 | 6/2002 | Holton | |
| 2006/0227316 A1 * | 10/2006 | Gatt | G01S 7/4811 356/5.09 |
| 2008/0018881 A1 | 1/2008 | Hui et al. | |
| 2011/0205523 A1 | 8/2011 | Rezk et al. | |
| 2013/0148095 A1 | 6/2013 | Coda et al. | |
| 2017/0269214 A1 | 9/2017 | Marron et al. | |
| 2018/0210071 A1 * | 7/2018 | Bash | G01S 7/4917 |
| 2018/0224547 A1 * | 8/2018 | Crouch | G01S 17/58 |
| 2018/0278337 A1 | 9/2018 | Jensen et al. | |
| 2019/0204441 A1 * | 7/2019 | Feneyrou | G01S 17/34 |
| 2019/0310372 A1 * | 10/2019 | Crouch | G01S 7/491 |

FOREIGN PATENT DOCUMENTS

WO 2018/160240 A2 9/2018

OTHER PUBLICATIONS

"Understanding Waveplates", Edmund Optics, Oct. 2018, 8 pages.
International Search Report and Written Opinion of the International Searching Authority in connection with International Patent Application No. PCT/US2019/057951 dated Feb. 7, 2020, 13 pages.

* cited by examiner

*Primary Examiner* — Michael A Lyons (57) ABSTRACT

A method includes generating a transmit beam in different intervals of time and directing the transmit beam towards an area or object of interest. The method also includes receiving a receive beam that includes the transmit beam as reflected from the area or object of interest. The method further includes generating local oscillator (LO) laser light. The transmit beam and the LO laser light are frequency-shifted such that the transmit beam has a higher frequency than the LO laser light in a first subset of the intervals and a lower frequency than the LO laser light in a second subset of the intervals. In addition, the method includes processing the LO laser light and the receive beam to identify information about the area or object of interest.

20 Claims, 5 Drawing Sheets

TECHNIQUE FOR REDUCING IMPACT OF BACKSCATTER IN COHERENT LASER DETECTION AND RANGING (LADAR) SYSTEMS

TECHNICAL FIELD

This disclosure relates generally to laser systems. More specifically, this disclosure relates to a technique for reducing the impact of backscatter in coherent laser detection and ranging (LADAR) systems.

BACKGROUND

Laser detection and ranging (LADAR) systems can be used to illuminate an area or one or more objects of interest using laser light, and reflected laser light from the area or objects can be received and analyzed to identify information about the area or objects. For example, a LADAR system can be used to illuminate a moving object in order to determine a distance to the object and a speed of the object. A LADAR system can also be used to generate images of an area or one or more objects.

SUMMARY

This disclosure provides a technique for reducing the impact of backscatter in coherent laser detection and ranging (LADAR) systems.

In a first embodiment, a method includes generating a transmit beam in different intervals of time and directing the transmit beam towards an area or object of interest. The method also includes receiving a receive beam that includes the transmit beam as reflected from the area or object of interest. The method further includes generating local oscillator (LO) laser light. The transmit beam and the LO laser light are frequency-shifted such that the transmit beam has a higher frequency than the LO laser light in a first subset of the intervals and a lower frequency than the LO laser light in a second subset of the intervals. In addition, the method includes processing the LO laser light and the receive beam to identify information about the area or object of interest.

In a second embodiment, a system includes a laser source configured to generate a transmit beam in different intervals of time. The system also includes an LO source configured to generate LO laser light. The system further includes optics configured to receive a receive beam that includes the transmit beam as reflected from an area or object of interest. In addition, the system includes a controller configured to control frequency-shifting of the transmit beam and the LO laser light such that the transmit beam has a higher frequency than the LO laser light in a first subset of the intervals and a lower frequency than the LO laser light in a second subset of the intervals.

In a third embodiment, a non-transitory computer readable medium contains instructions that when executed cause a controller to control generation, by a laser source, of a transmit beam that is transmitted towards an area or object of interest in different intervals of time. The medium also contains instructions that when executed cause the controller to control generation, by an LO source, of LO laser light that is mixed with a receive beam, where the receive beam includes the transmit beam as reflected from the area or object of interest. The medium further contains instructions that when executed cause the controller to frequency-shift the transmit beam and LO laser light such that the transmit beam has a higher frequency than the LO laser light in a first subset of the intervals and a lower frequency than the LO laser light in a second subset of the intervals.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, laser detection and ranging (LADAR) systems can be used to illuminate an area or one or more objects of interest using laser light, and reflected laser light from the area or objects can be received and analyzed to identify information about the area or objects. A coherent LADAR system typically includes a transmitter that generates and transmits the laser light and a receiver that collects the reflected laser light, where the received laser light is optically mixed with coherent light from a local oscillator (LO). The mixing of the received laser light and the local oscillator light produces an interference signal with a power level that is modulated at a frequency determined by the difference between the optical frequency of the received laser light and the optical frequency of the local oscillator light. This difference is typically referred to as an intermediate frequency (IF). The interference signal is then converted into an electrical signal.

Coherent LADAR systems are often designed so that the interference signal is converted into the electrical signal using at least one optical detector, where at least one amplifier amplifies the electrical signal and additional components process the amplified electrical signal. The optical detector and the amplifier are typically designed to pass a desired range of frequencies (which includes the intermediate frequency) while attenuating frequencies outside the desired range. The desired range of frequencies is referred to as the passband of the system.

Unfortunately, in a coherent LADAR system where laser light is transmitted and received simultaneously, the transmitted laser light can scatter or be reflected off optics or other components of the LADAR system itself or off one or more near-range objects (meaning objects much closer to the LADAR system than an area or one or more objects of interest). This scattered laser light can return to the receiver and produce undesired signals that obscure at least one desired signal (the laser light reflected from the area or one or more objects of interest). This scattered laser light is typically referred to as "backscatter" or "backscattered light." Backscattered light can be many orders of magnitude stronger than laser light reflected from an area or object of interest since the backscattered light travels much smaller distances compared to the light reflected from the area or object of interest, which is typically much farther away from the transmitter. As a result, the backscattered light can saturate a first-stage amplifier or other components of the receiver, resulting in a loss of a desired signal. The backscattered light can also produce harmonics and sidelobes that obscure a desired signal. This can occur even if the backscattered light has a frequency below the passband of the LADAR system.

One prior approach for handling backscatter involved the use of separate transmit and receive apertures for transmitting laser light and receiving reflected laser light. However, this approach still allows backscattered light from near-range objects to be received through the receive aperture, and this approach increases the size, complexity, and cost of the overall system. Another prior approach involved the use of extreme requirements on the design and cleanliness of optical surfaces and other components of a LADAR system. However, this approach still allows backscattered light from near-range objects to be received and may not prevent backscatter from the LADAR system components, and this approach increases the complexity and cost of the overall system. Still another prior approach involved adjusting the timing and interval of transmitted pulses in the laser light directed at a target. However, the effectiveness of this approach is limited in some cases to the use of lower-bandwidth waveforms.

This disclosure describes approaches for reducing the impact of backscatter in coherent LADAR systems. Among other things, the described approaches use frequency shifting of both transmitted laser light and local oscillator light at specific intervals. In particular, the frequency shifting and intervals are chosen so that intermediate frequency signals generated using laser light reflected off an area or any objects within an intended range are within a passband of the LADAR system, while intermediate frequency signals generated based on backscatter are at much higher frequencies than the passband of the system. The backscatter here includes laser light reflected from one or more components of the LADAR system itself and laser light reflected from any areas or objects not within the intended range. As a result, any desired receive signals are within the passband of the system, and signals from unwanted backscatter are above the passband and are therefore highly attenuated.

In this way, a coherent LADAR system can be operated to attenuate or reject backscattered light that interferes with the detection of signals from one or more areas or objects of interest, which can help to significantly improve the operation of the LADAR system. Moreover, this can be accomplished in LADAR systems that use a common transmit and receive aperture and in LADAR systems that use separate transmit and receive apertures, and these approaches do not necessarily require the use of extreme requirements on the design and cleanliness of optical surfaces and other components. In addition, these approaches are not limited to the use of lower-bandwidth waveforms.

Figure 1:
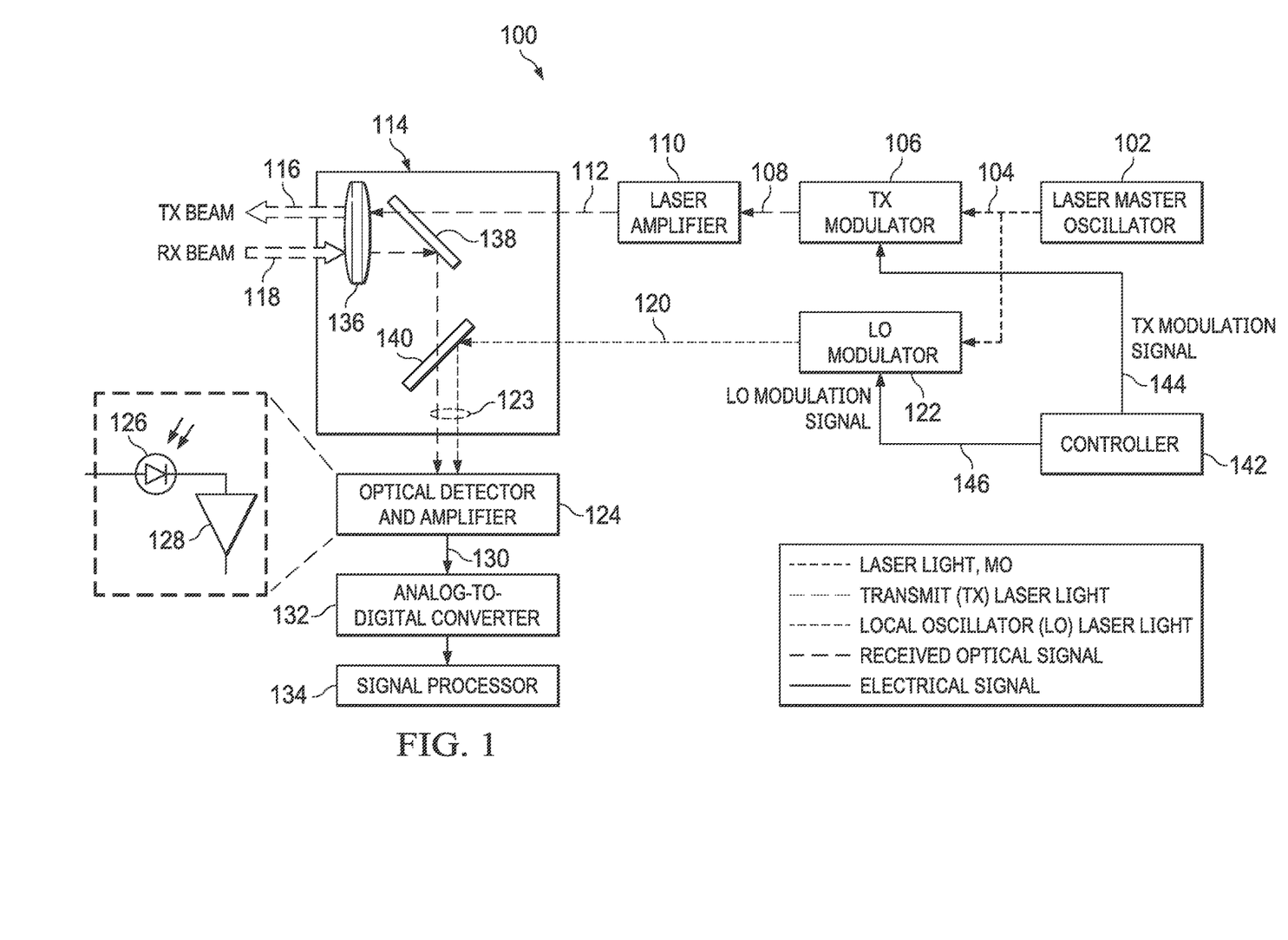
FIG. 1 illustrates an example coherent laser detection and ranging (LADAR) system in accordance with this disclosure.

FIG. 1 illustrates an example coherent LADAR system 100 in accordance with this disclosure. As shown in FIG. 1, the coherent LADAR system 100 includes a laser source that generates an optical signal transmitted towards one or more areas or objects of interest. In this example, a master oscillator (MO) 102 generates MO laser light 104, which is used by other components of the LADAR system 100. The master oscillator 102 includes any suitable structure configured to generate laser light. For example, the master oscillator 102 may represent a laser, such as one or more diode lasers, that operate at wavelengths greater than about 1.5 μm. In some embodiments, the master oscillator 102 represents a continuous wave (CW) laser.

The MO laser light 104 is provided to a transmit (TX) modulator 106. The transmit modulator 106 modulates the MO laser light 104 to generate transmit laser light 108. For example, the transmit modulator 106 may perform frequency modulation of the MO laser light 104 to generate "transmit chirps" in the transmit laser light 108. A "chirp" here generally refers to a portion of an optical signal that increases or decreases in frequency, typically over a short period of time. However, as described below, the use of transmit chirps is not required here. The transmit modulator 106 includes any suitable structure configured to modulate an optical signal.

An amplifier 110 receives and amplifies the transmit laser light 108 to generate amplified transmit laser light 112. The amplifier 110 includes any suitable structure configured to amplify an optical signal, such as a fiber amplifier, planar waveguide (PWG) amplifier, or other optical amplifier. The amplified transmit laser light 112 passes through an optics section 114 of the LADAR system 100 and exits the LADAR system 100 as a coherent transmit beam 116.

A receive (RX) beam 118 received by the LADAR system 100 includes laser energy from the transmit beam 116 that has been reflected from one or more areas or objects. For example, the receive beam 118 may include laser energy reflected off one or more areas or objects of interest and one or more near-range objects. The receive beam 118 may also include laser energy reflected from one or more components of the LADAR system 100 itself, such as from one or more components of the optics section 114. Because the receive beam 118 represents reflected laser energy from the transmit beam 116, the receive beam 118 may include "receive chirps" that represent reflected versions of the transmit chirps contained in the transmit beam 116. However, as described below, the use of receive chirps is not required here.

The receive beam 118 passes through the optics section 114, and the receive beam 118 is mixed with local oscillator (LO) laser light 120. The LO laser light 120 here is generated by a local oscillator source formed using an LO modulator 122. The LO modulator 122 receives and modulates the MO laser light 104 to generate the LO laser light 120. For example, the LO modulator 122 may perform frequency modulation of the MO laser light 104 to generate "LO chirps" in the LO laser light 120. However, as described below, the use of LO chirps is not required here. The LO modulator 122 includes any suitable structure configured to modulate an optical signal.

The receive beam 118 is mixed with the LO laser light 120 to produce an interference signal 123, which is formed by coherent interference between the receive beam 118 and the LO laser light 120. The interference signal 123 is provided to an optical detector and amplifier block 124, which includes at least one optical detector 126 and at least one first-stage amplifier 128. Each optical detector 126 receives at least part of the interference signal 123 and generates a corresponding electrical signal, and each amplifier 128 amplifies at least one electrical signal to generate at least one output electrical signal 130. Each optical detector 126 includes any suitable structure configured to detect an optical signal, such as a photodiode or other photodetector. Depending on the implementation, there may be a single optical detector 126 or multiple optical detectors 126, such as an array of optical detectors 126 arranged in rows and columns. Each amplifier 128 includes any suitable structure configured to amplify an electrical signal, such as a low noise amplifier. In some embodiments, each optical detector 126 generates an electrical current, and each amplifier 128 represents a transimpedance amplifier (TIA) that functions as a current-to-voltage converter. In some cases, the optical detector(s) 126 can be integrated with the amplifier(s) 128 into a single package.

The output electrical signal 130 is provided to an analog-to-digital converter (ADC) 132, which digitizes the output electrical signal 130. The analog-to-digital converter 132 includes any suitable structure configured to convert an analog signal into digital values. A signal processor 134 processes the digital values representing the output electrical signal 130 in order to identify information about one or more areas or objects of interest illuminated using the transmit beam 116. For example, the signal processor 134 may generate one or more images of one or more areas or objects illuminated using the transmit beam 116. The signal processor 134 may also or alternatively identify one or more objects illuminated using the transmit beam 116 and the speed and direction of movement for each object. The signal processor 134 includes any suitable structure configured to process data representing a reflected optical signal in order to identify information related to one or more areas or objects. The signal processor 134 may, for instance, include one or more microprocessors, microcontrollers, digital signal processors (DSPs), field programmable gate arrays (FPGAs), application specific integrated circuits (ASICs), or discrete circuitry.

The optics section 114 generally includes one or more optical devices or optics, such as one or more mirrors, lenses, or other devices, used to direct or otherwise guide one or more optical signals. In this example, the optics section 114 is designed to support transmission of the transmit beam 116 and reception of the receive beam 118 through a common aperture 136. However, this need not be the case, and separate apertures may be provided for the transmit beam 116 and the receive beam 118. Each aperture 136 represents any suitable opening or passage configured to allow transit of at least one optical signal.

To support the use of a single aperture 136 here, the optics section 114 includes a first mirror 138 and a second mirror 140. The first mirror 138 is generally transmissive for the amplified transmit laser light 112 and generally reflective for the receive beam 118. As a result, the amplified transmit laser light 112 substantially or completely passes through the first mirror 138 to reach the aperture 136, while the receive beam 118 substantially or completely reflects from the first mirror 138 towards the optical detector and amplifier block 124. The second mirror 140 is generally transmissive for the receive beam 118 and generally reflective for the LO laser light 120. As a result, the receive beam 118 substantially or completely passes through the second mirror 140 and the LO laser light 120 substantially or completely reflects from the second mirror 140 to generate the interference signal 123. Each mirror 138 and 140 includes any suitable structure configured to at least substantially pass one optical signal and at least substantially reflect another optical signal.

Note, however, that the use of mirrors may be not required here, such as when the mirror 138 is omitted and the transmit and receive beams 116 and 118 pass through different apertures. Also, the functionality of the mirrors 138 and 140 can be implemented using a single optical device or other optical devices. For example, in some embodiments, the mirrors 138 and 140 can be replaced by an annular mirror having a central opening. The transmit beam 116 can be focused to pass through the central opening, and the receive beam 118 and the LO laser light 120 can be reflected from the annular mirror. As another example, the mirrors 138 and 140 can be replaced by an optical isolator that includes a polarizing cube beamsplitter or other beamsplitter and a ¼λ waveplate. The transmit beam 116 can pass through the beamsplitter and the waveplate, while the receive beam 118 can pass through the waveplate and be reflected by the beamsplitter. In general, any number of arrangements of one or more optical devices can be used here.

A controller 142 controls the operation of the transmit modulator 106 and the LO modulator 122. For example, the controller 142 may provide a transmit modulation signal 144 to the transmit modulator 106, which uses the modulation signal 144 to control the waveform and timing of the transmit chirps contained in the laser light 108, thereby controlling the waveform and timing of the transmit chirps contained in the transmit beam 116. Similarly, the controller 142 may provide an LO modulation signal 146 to the LO modulator 122, which uses the modulation signal 146 to control the waveform and timing of the LO chirps contained in the LO laser light 120. Once again, however, note that the use of chirps is not required here.

As described in more detail below, the controller 142 controls the modulators 106 and 122 (via the modulation signals 144 and 146) to frequency-shift both the frequency of the transmit beam 116 and the frequency of the LO laser light 120. The controller 142 also controls the modulators 106 and 122 (via the modulation signals 144 and 146) to control the intervals in which the transmit beam 116 and the LO laser light 120 are generated. The frequency shifting and the intervals can be chosen by the controller 142 so that one or more desired intermediate frequency signals created by mixing the receive beam 118 and the LO laser light 120 are within a passband of the first-stage amplifier 128. Intermediate frequency signals generated based on backscatter are at much higher frequencies than the passband of the first-stage amplifier 128 and are therefore highly attenuated, reducing or eliminating the effects of the backscatter.

The controller 142 includes any suitable structure configured to control operation of one or more modulators. For example, the controller 142 may include one or more microprocessors, microcontrollers, DSPs, FPGAs, ASICs, or discrete circuitry. Note that separate devices forming the controller 142 may be used to provide separate control for the modulators 106 and 122. Also note that the functions of the signal processor 134 and the controller 142 can be performed using the same device or combination of devices.

Although FIG. 1 illustrates one example of a coherent LADAR system 100, various changes may be made to FIG. 1. For example, the system 100 shown in FIG. 1 is a simplified version of a LADAR system. Various LADAR systems have been developed over the years, and additional LADAR systems are sure to be developed in the future. The techniques described in this disclosure may find use in a wide variety of LADAR systems and are not limited to the specific implementation shown in FIG. 1.

Figure 2:
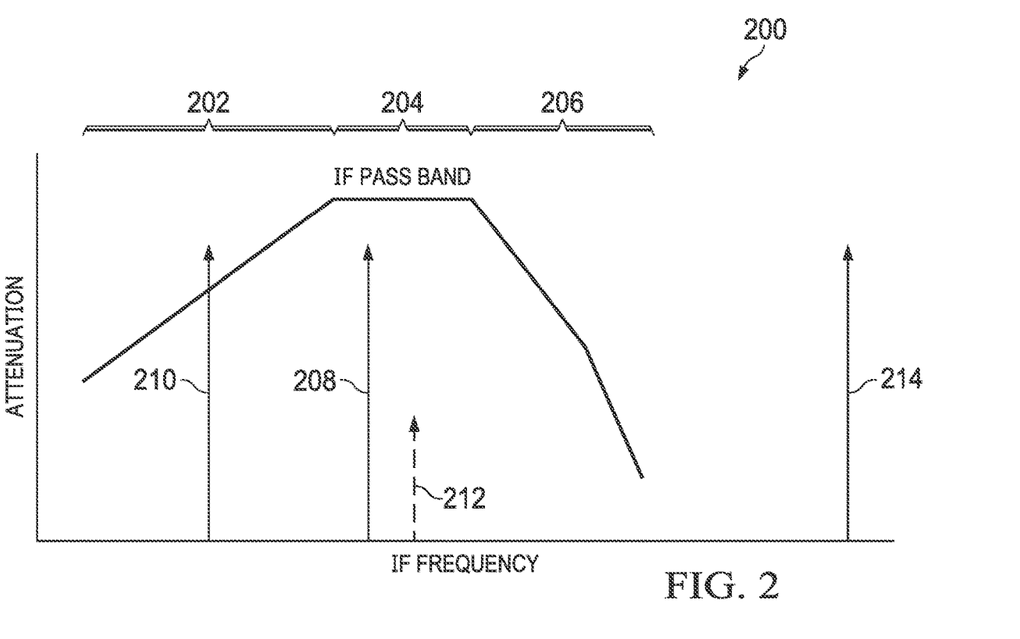
FIG. 2 illustrates an example frequency response of a first-stage amplifier in a coherent LADAR system in accordance with this disclosure.

FIG. 2 illustrates an example frequency response 200 of a first-stage amplifier in a coherent LADAR system in accordance with this disclosure. For example, FIG. 2 may show the frequency response of the first-stage amplifier 128 in the LADAR system 100 of FIG. 1. Note, however, that the frequency response shown here may be found in any other suitable LADAR system and that first-stage amplifiers may have different frequency responses than the one shown in FIG. 2.

As shown in FIG. 2, the frequency response 200 plots intermediate frequencies produced by mixing the receive beam 118 with the LO laser light 120 against attenuation, where moving down along the attenuation axis indicates more attenuation is occurring. Here, the frequency response 200 includes a first portion 202 in which the attenuation decreases as the intermediate frequency increases, a second portion 204 in which the attenuation is generally steady as the intermediate frequency increases, and a third portion 206 in which the attenuation increases as the intermediate frequency increases. Since the second portion 204 is generally steady in attenuation, this area represents or defines the passband of the first-stage amplifier 128. Ideally, the intermediate frequency associated with laser energy reflected from each area or object of interest and contained in the interference signal 123 falls within this passband, allowing the LADAR system 100 to identify that area or object.

As noted above, backscattered light may be contained within the receive beam 118. The backscattered light represents laser energy that reflects from the LADAR system 100 itself, from one or more near-range objects, or from other sources. The presence of backscattered light in the receive beam 118 may lead to the creation of at least one large tone 208 within the passband of the first-stage amplifier 128. Even if a suitable technique is used to cause the backscattered light to generate a large tone 210 lower than the passband of the first-stage amplifier 128, the tone 210 might still have a harmonic 212 that appears within the passband of the first-stage amplifier 128. In either case, the presence of the tone 208 or harmonic 212 within the passband of the first-stage amplifier 128 can easily saturate the first-stage amplifier 128 or otherwise interfere with the operation of the LADAR system 100.

As described in more detail below, the approaches described in this patent document can be used to push one or more tones 214 associated with backscatter to intermediate frequencies that are higher (and ideally much higher) than the passband of the first-stage amplifier 128. When tones 214 associated with backscatter are higher than the passband of the first-stage amplifier 128, any harmonics of those tones 214 would also be higher than the passband of the first-stage amplifier 128. As a result, any tones 214 caused by backscatter and their harmonics would be greatly attenuated by the first-stage amplifier 128, reducing or eliminating the possibility of the backscatter saturating the first-stage amplifier 128 or otherwise interfering with the operation of the LADAR system 100.

Although FIG. 2 illustrates one example of a frequency response 200 of a first-stage amplifier in a coherent LADAR system, various changes may be made to FIG. 2. For example, the frequency response 200 shown in FIG. 2 is for illustration only, and other first-stage amplifiers can have different frequency responses. Also, the exact numbers and locations of the tones and harmonics shown in FIG. 2 are for illustration only.

Figure 3:
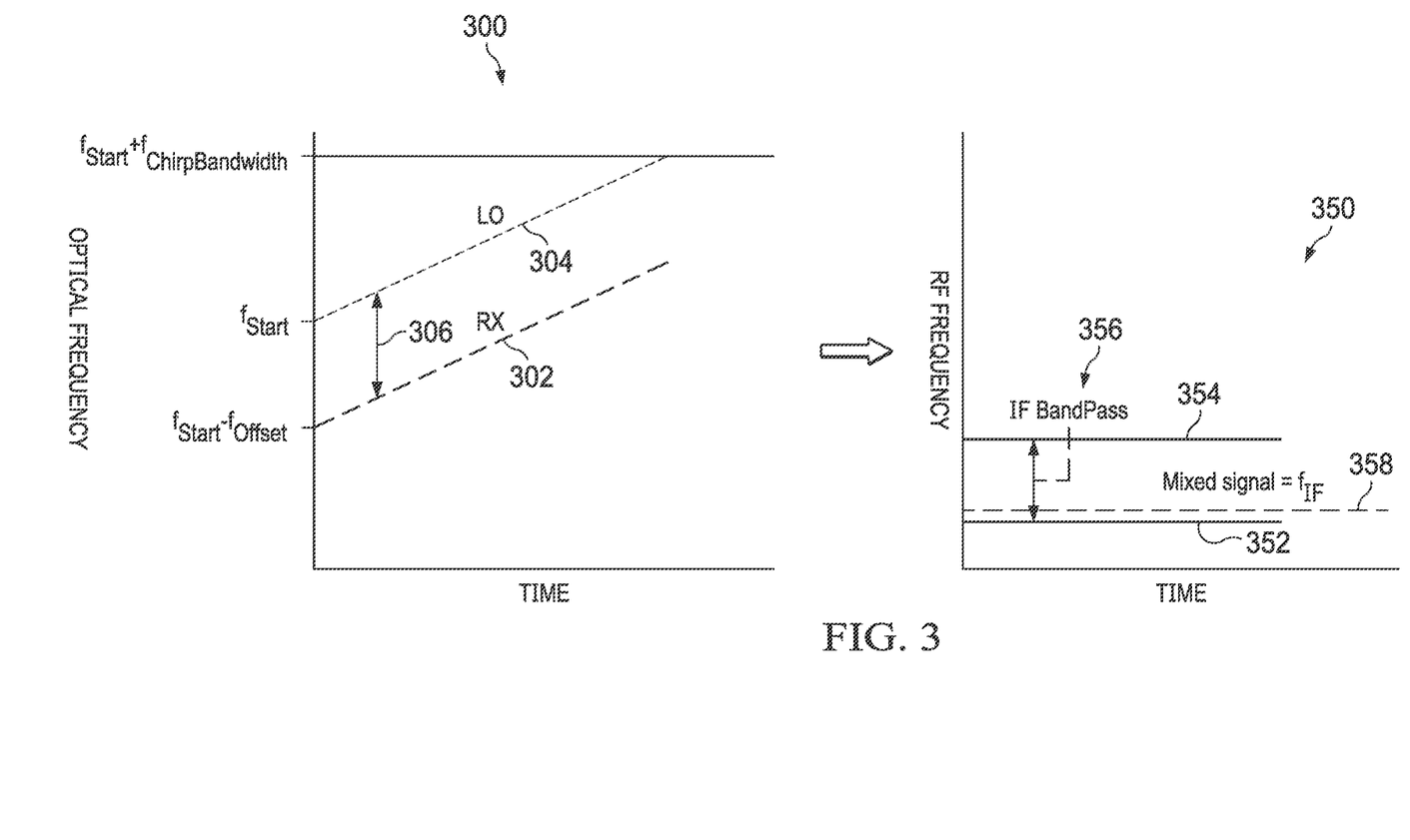
FIG. 3 illustrates an example mixing operation in a coherent LADAR system in accordance with this disclosure.

FIG. 3 illustrates an example mixing operation in a coherent LADAR system in accordance with this disclosure. For example, FIG. 3 may show the mixing of the receive beam 118 and the LO laser light 120 to produce the interference signal 123 and the resulting conversion of the interference signal 123 into the electrical signal 130. Note, however, that the mixing operation shown here may be performed in any other suitable LADAR system.

As shown in FIG. 3, a plot 300 identifies the frequency of a receive chirp 302 contained in the receive beam 118 over time and the frequency of an LO chirp 304 contained in the LO laser light 120 over time. As can be seen here, the LO chirp 304 contained in the LO laser light 120 generally begins at a starting frequency (denoted $f_{Start}$) and increases by a specified amount (denoted $f_{ChirpBandwidth}$). The receive chirp 302 contained in the receive beam 118 generally begins at a starting frequency that is less than $f_{Start}$ by a frequency offset (denoted $f_{Offset}$) 306 and increases by the same specified amount $f_{ChirpBandwidth}$.

A plot 350 shown in FIG. 3 represents operation of the optical detector 126 and the first-stage amplifier 128. The plot 350 includes a lower threshold 352 and an upper threshold 354 that define the passband 356 of the first-stage amplifier 128. The plot 350 also includes a signal 358 having an intermediate frequency ($f_{IF}$), which is equal to $f_{Offset} - f_{Doppler}$. Here, $f_{Doppler}$ represents a Doppler shift, which is a frequency shift between the between the transmit beam 116 and the receive beam 118. If the range-rate of an object or area of interest relative to the sensor is zero, the Doppler shift will be zero, and $f_{IF} = f_{Offset}$. Having some estimate or bounds on the expected range rate, the value of $f_{Offset}$ can be chosen so that $f_{Offset} + f_{Doppler}$ represents a frequency within the IF bandpass of the optical detector 126 and the first-stage amplifier 128.

Assuming the receive chirp 302 represents laser energy reflected from an area or object of interest, the frequency offset $f_{Offset}$ ideally falls within the passband 356 of the first-stage amplifier 128. Also, any tones or harmonics created by backscatter are ideally far above the passband 356 of the first-stage amplifier 128 in the plot 350, enabling the LADAR system 100 to operate effectively and reject the backscatter.

It is useful to note here that the same arrangement shown in FIG. 3 can be obtained for different starting frequencies for the chirps 302 and 304 in the receive beam 118 and the LO laser light 120. As long as the chirps 304 in the LO laser light 120 have the same general frequency offset 306 from the chirps 302 in the receive beam 118, the resulting signal 358 can fall within the passband 356 of the first-stage amplifier 128. This property can be used as discussed below to support frequency-shifting of both the chirps in the transmit beam 116 and the chirps in the LO laser light 120 at specific intervals. The intervals can be selected so that the chirps in the receive beam 118 are offset from the chirps in the LO laser light 120 with substantially the same offset in each interval, while the chirps in the LO laser light 120 are much farther away in terms of frequency from the chirps in the transmit beam 116. This helps to maintain accurate operation of the LADAR system 100 while pushing tones and harmonics of backscatter outside the passband of the first-stage amplifier 128.

Although FIG. 3 illustrates one example of a mixing operation in a coherent LADAR system, various changes may be made to FIG. 3. For example, the chirps in the various signals may differ from those shown here, such as when the chirps decrease rather than increase in frequency. Also, the frequencies and passband shown here are for illustration only. In addition, as described below, the use of chirps is not required, and the transmit beam 116, receive beam 118, and LO laser light 120 can have other suitable frequencies.

Figure 4:
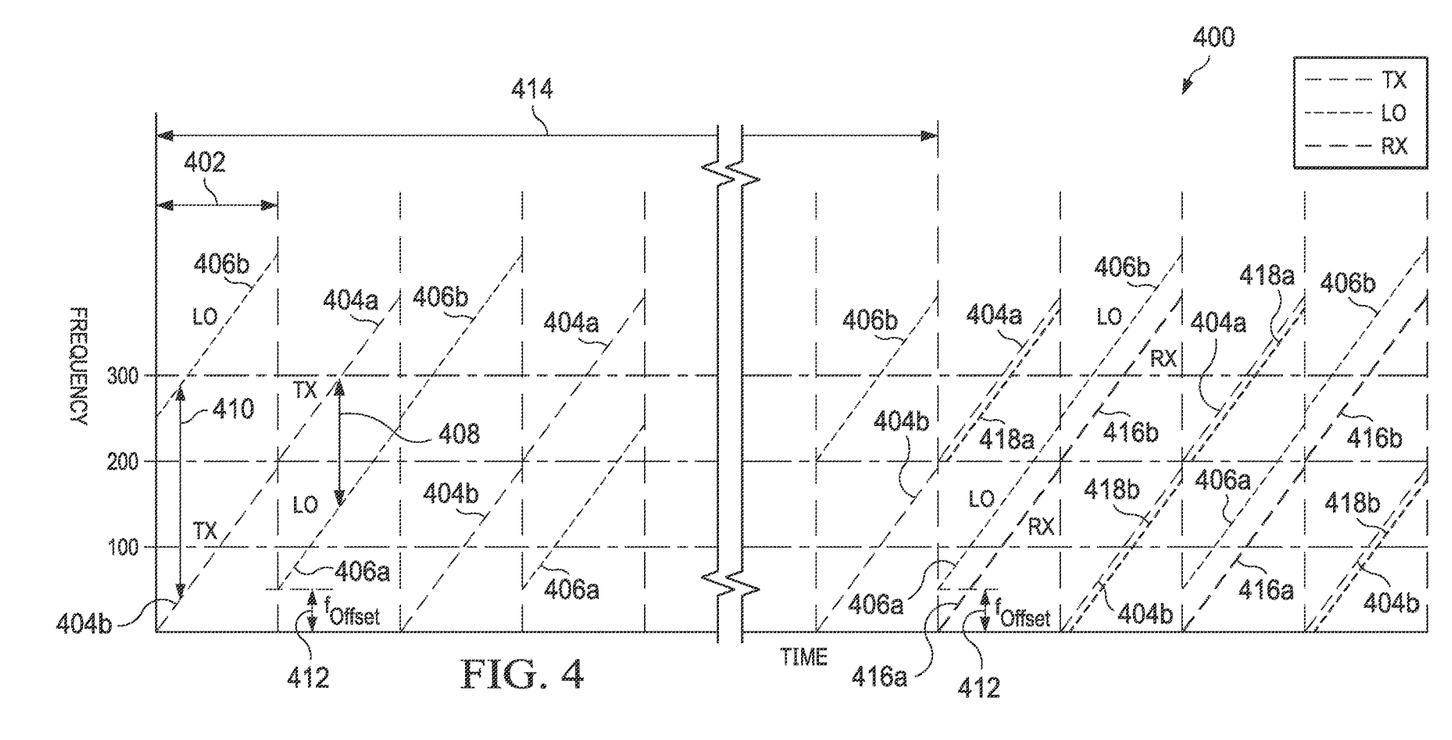
FIG. 4 illustrates an example transmission scheme for reducing the impact of backscatter in a coherent LADAR system in accordance with this disclosure.

FIG. 4 illustrates an example transmission scheme 400 for reducing the impact of backscatter in a coherent LADAR system in accordance with this disclosure. In particular, FIG. 4 illustrates how the controller 142 in the LADAR system 100 can perform frequency shifting and interval definition when controlling the operation of the modulators 106 and 122. While the transmission scheme 400 is described as being used in the LADAR system 100 of FIG. 1, the transmission scheme 400 shown here may be used in any other suitable LADAR system.

As shown in FIG. 4, time is divided into multiple intervals 402, and the length (period) of each interval 402 may be represented as a time $t_{Chirp}$. The length of the intervals 402 may also be referred to as the repetition interval. Within each interval 402, a transmit chirp 404a or 404b is generated by the transmit modulator 106 in the transmit beam 116, and an LO chirp 406a or 406b is generated by the LO modulator 122 in the LO laser light 120. However, the transmit chirps 404a-404b are frequency shifted from one interval 402 to the next consecutive interval 402 in an alternating manner, meaning the starting frequency of the chirps 404a differs from the starting frequency of the chirps 404b. Similarly, the LO chirps 406a-406b in the LO laser light 120 are frequency shifted from one interval 402 to the next consecutive interval 402 in an alternating manner, meaning the starting frequency of the chirps 406a differs from the starting frequency of the chirps 406b. In this example, both the chirps 404a-404b in the transmit beam 116 and the chirps 406a-406b in the LO laser light 120 are shifted by 200 MHz from one interval 402 to the next (although shifts by other amounts are also possible).

The chirps 404a-404b and the chirps 406a-406b are frequency-shifted in opposing directions. If the transmit modulator 106 increases the frequency of a transmit chirp in an interval 402, the LO modulator 146 decreases the frequency of an LO chirp in the same interval 402. If the transmit modulator 106 decreases the frequency of a transmit chirp in an interval 402, the LO modulator 146 increases the frequency of an LO chirp in the same interval 402. Thus, in the first interval 402, the transmit chirp 404a has a lower frequency than the LO chirp 406a. In the second interval, the frequencies have shifted so that the transmit chirp 404b has a higher frequency than the LO chirp 406b. In the third interval 402, the frequencies have shifted so that the transmit chirp 404a again has a lower frequency than the LO chirp 406a. This alternating pattern can be repeated for any number of intervals 402 and leads to the existence of two distinct subsets of intervals, namely a first subset in which the transmit chirps 404a have a higher frequency than the LO chirps 406a and a second subset in which the transmit chirps 404b have a lower frequency than the LO chirps 406b.

Here, the chirps 404a in the transmit beam 116 are separated from the chirps 406a in the LO laser light 120 by an offset 408, which in this example represents a 150 MHz offset (although offsets of other amounts are also possible). Also, the chirps 404b in the transmit beam 116 are separated from the chirps 406b in the LO laser light 120 by an offset 410, which in this example represents a 250 MHz offset (although offsets of other amounts are also possible). However, neither of these offsets 408 and 410 needs to reside within the passband of the first-stage amplifier 128. Rather, it is a frequency offset 412 defined between the starting frequency of the chirp 404a or 404b in one interval 402 and the starting frequency of the chirp 406b or 406a in the adjacent intervals 402 that resides within the passband of the first-stage amplifier 128 (for reasons discussed below).

In this example, it is generally assumed that a transmit chirp 404a or 404b sent towards an area or object of interest will reflect from the area or object and return to the LADAR system 100 after a certain period of time 414. Because of this, receive chirps 416a and 416b in the receive beam 118 start being received by the LADAR system 100 during the intervals 402 after the period of time 414 has elapsed. By selecting the length of the intervals 402 appropriately (as described below), the receive chirps 416a in the receive beam 118 are received in the same intervals 402 that the LO chirps 406a in the LO laser light 120 are generated, and the chirps 406a and 416a are separated by the frequency offset 412. Similarly, the receive chirps 416b in the receive beam 118 are received in the same intervals 402 that the LO chirps 406b in the LO laser light 120 are generated, and the chirps 406b and 416b are separated by the frequency offset 412. Thus, it is possible to perform the same mixing shown in FIG. 3 using the chirps 406a, 416a or the chirps 406b, 416b in each interval 402 after the period of time 414 has elapsed. As a result, even when the chirps 404a-404b and 406a-406b are frequency-shifted in an alternating manner as shown in FIG. 4, the LADAR system 100 can still successfully mix the chirps 406a, 416a and the chirps 406b, 416b to recover information about one or more areas or objects of interest.

This transmission scheme 400 also helps to significantly reduce or eliminate the effects of backscatter on the LADAR system 100. This is because the delay between transmission of a transmit chirp 404a, 404b and the reception of a corresponding receive chirp 416a, 416b reflected from an area or object of interest is long (relatively speaking) compared to the delay between transmission of a transmit chirp 404a, 404b and the reception of a corresponding backscattered chirp 418a, 418b. This results from the fact that the backscatter is caused by one or more components of the LADAR system 100 itself or by near-range objects, which means the travel time for laser light is much smaller. In fact, the receipt of a backscattered chirp 418a, 418b may be nearly coincident in time with the transmission of a transmit chirp 404a, 404b that was backscattered.

By selecting the length of the intervals 402 appropriately (as described below), the backscattered chirps 418a in the receive beam 118 are received in the same intervals 402 that the LO chirps 406a in the LO laser light 120 are generated. The backscattered chirps 418a have a much larger frequency offset from the LO chirps 406a compared to the frequency offset 412 between the chirps 406a and 416a. Since it is the difference in frequency between the chirps 406a and 418a that defines the intermediate frequency representing the chirps 418a, the larger offset between the chirps 406a and 418a pushes that intermediate frequency outside the passband of the first-stage amplifier 128. Similarly, the backscattered chirps 418b in the receive beam 118 are received in the same intervals 402 that the LO chirps 406b in the LO laser light 120 are generated. The backscattered chirps 418b have a much larger offset from the chirps 406b compared to the frequency offset 412 between the chirps 406b and 416b. Again, since it is the difference in frequency between the chirps 406b and 418b that defines the intermediate frequency representing the chirps 418b, the larger offset between the chirps 406b and 418b pushes that intermediate frequency outside the passband of the first-stage amplifier 128. In both cases, the first-stage amplifier 128 is able to attenuate the intermediate frequency or intermediate frequencies associated with the backscatter. In this way, the effects of backscatter can be significantly reduced or eliminated in the LADAR system 100.

In order to achieve the transmission scheme 400 shown in FIG. 4, the length of each interval 402 can be chosen so that the round trip flight time of laser energy given a specified range of interest (a specified distance) is equal to an odd integer multiple of the interval length. As a particular example, assume that a nominal length of 1.0 millisecond is initially selected for the intervals 402. Also assume that a desired range of interest is approximately $2.0 \times 10^7$ meters. Given the speed of light of approximately $2.998 \times 10^8$ meters per second and a round trip distance of approximately $4.0 \times 10^7$ meters, the total number of 1.0 millisecond intervals 402 needed between transmission of a chirp and reception of a reflected chirp is approximately 133.42. By adjusting the length of each interval 402 to approximately 1.00318 milliseconds, the total number of intervals 402 needed between transmission of a chirp and reception of a reflected chirp is now approximately 133, which is an odd number. The use of an odd number of intervals 402 helps to ensure that the receive chirps 416a, 416b are received in intervals 402 where they are closer to the LO chirps 406a, 406b and farther from the transmit chirps 404a, 404b. The lengths of the intervals 402 can also be much longer than the round trip flight time for backscattered light.

As noted above, both the transmit chirps 404a-404b in the transmit beam 116 and the LO chirps 406a-406b in the LO laser light 120 shift by some amount (such as 200 MHz) from one interval 402 to the next consecutive interval 402. This frequency shift (denoted $f_{Shift}$) can be chosen so that the frequency shift is much higher than the passband of the first-stage amplifier 128. This helps to ensure that the backscattered chirps 418a-418b (which may be close to or at the same frequency as the transmit chirps 404a-404b) are far outside the passband of the first-stage amplifier 128. As an example, if the first-stage amplifier 128 has a center frequency ($f_{IF\_center}$) of approximately 50 MHz and a passband of approximately ±20 MHz, the frequency shift $f_{Shift}$ can be chosen so that $f_{Shift}-f_{IF\_center}$ is much greater than the upper end of the passband of the first-stage amplifier 128. Note that the offsets 408 and 410 in FIG. 4 are defined by the $f_{Shift}$ and $f_{Offset}$ values. That is, the offset 408 can equal $f_{Shift}-f_{Offset}$, and the offset 410 can equal $f_{Shift}+f_{Offset}$.

It should be noted that the receive chirps 416a-416b in FIG. 4 have the same frequency as the transmit chirps 404a-404b. This indicates that there is no frequency shifting between the transmit and receive chirps 404a-404b, 416a-416b. However, this need not be the case. In other embodiments, for example, the receive chirps 416a-416b may have a higher or lower frequency compared to the transmit chirps 404a-404b. This can be easily accommodated in the LADAR system 100 by ensuring that the LO chirps 406a-406b in the LO laser light 120 have a frequency offset $f_{Offset}$ with the receive chirps 416a-416b such that the intermediate frequency $f_{IF}$ is within the passband of the first-stage amplifier 128.

It should also be noted that the frequency offset $f_{Offset}$ here may vary during use. This is because the frequency offset $f_{Offset}$ typically varies based on the center frequency $f_{IF\_center}$ of the first-stage amplifier 128 and the Doppler frequency $f_{Doppler}$ of an area or object being illuminated using the transmit beam 116. In the example shown in FIG. 4, the Doppler frequency is assumed to be zero, and the frequency offset $F_{Offset}$ is assumed to be constant and match a center frequency $f_{IF\_center}$ of about 50 MHz. However, this need not be the case.

The transmission scheme 400 shown in FIG. 4 can be used in any suitable LADAR system. In some embodiments, for example, the transmission scheme 400 may be used with a synthetic aperture LADAR system having a continuous wave laser operating with a linear frequency modulation chirp at a duty cycle of close to 100%. Of course, any other suitable LADAR system can support the use of the transmission scheme 400 shown in FIG. 4.

Although FIG. 4 illustrates one example of a transmission scheme 400 for reducing the impact of backscatter in a coherent LADAR system, various changes may be made to FIG. 4. For example, while FIG. 4 illustrates a frequency range of about 0 MHz to about 450 MHz for the transmit and receive paths, any other suitable frequency range can be used. Also, while the transmission scheme 400 uses two patterns for the transmit chirps 404a-404b and the LO chirps 406a-406b, other transmission schemes having more than two patterns for the transmit and LO chirps may be used. As long as receive chirps are received in their respective intervals closer in frequency to LO chirps and farther in frequency from transmit and backscattered chirps, the approaches described above can allow for proper operation of the LADAR system while reducing or eliminating the effects of backscatter. In addition, as described below, the use of chirps is not required, and the transmit beam 116, receive beam 118, and LO laser light 120 can have other suitable frequencies.

Figure 5:
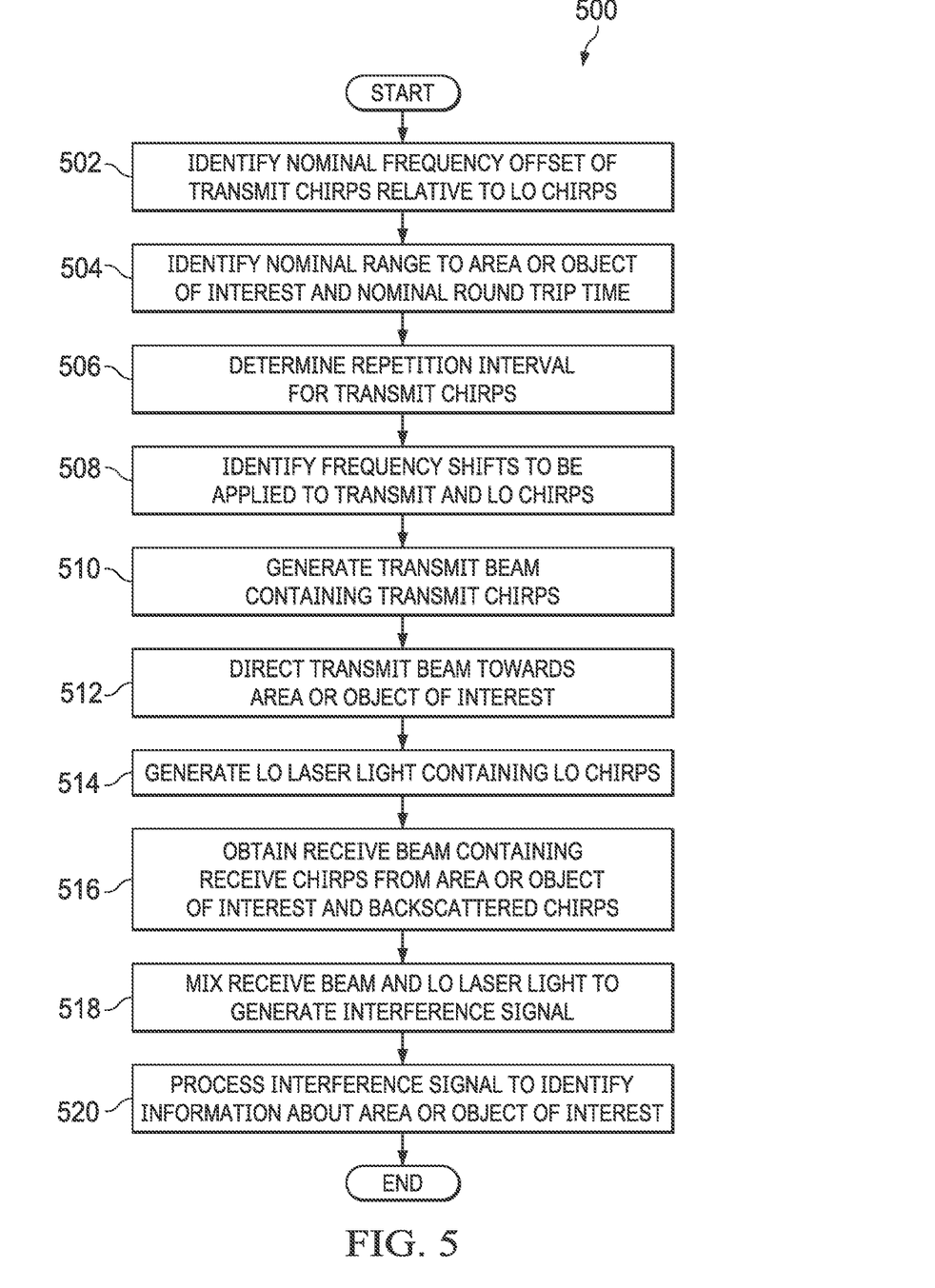
FIG. 5 illustrates an example method for reducing the impact of backscatter in a coherent LADAR system in accordance with this disclosure.

FIG. 5 illustrates an example method 500 for reducing the impact of backscatter in a coherent LADAR system in accordance with this disclosure. For ease of explanation, the method 500 is described as being performed using the transmission scheme 400 shown in FIG. 4 with the LADAR system 100 shown in FIG. 1. However, the method 500 can be performed using any suitable LADAR system supporting any suitable transmission scheme designed in accordance with this disclosure.

As shown in FIG. 5, a nominal frequency offset of transmit chirps relative to LO chirps is identified at step 502. This may include, for example, the controller 142 identifying an initial value of the frequency offset $f_{Offset}$ to be used between the transmit chirps 404a-404b and the LO chirps 406a-406b. The frequency offset $f_{Offset}$ can be chosen initially to keep expected receive chirps 416a-416b within the passband of the first-stage amplifier 128, assuming that the receive chirps 416a-416b will be roughly time-aligned with the LO chirps 406a-406b. As noted above, the frequency offset $f_{Offset}$ can be based on the center frequency $f_{IF\_center}$ of the first-stage amplifier 128 and any Doppler frequency $f_{Doppler}$.

A nominal range to an area or object of interest and a nominal round trip time of laser light to the area or object of interest are identified at step 504. This may include, for example, the controller 142 identifying the nominal range to the area or object of interest and the nominal round trip time in any suitable manner. For example, standard range-finding operations might be performed based on time of flight calculations using one or more laser pulses to identify the nominal range and the nominal round trip time.

A repetition interval for transmit chirps is determined at step 506. This may include, for example, the controller 142 identifying a length of the intervals 402 such that the nominal round trip time divided by the interval length results in an odd integer result. As noted above, the length of the intervals 402 can be much longer than the expected round trip flight time for backscattered light. Frequency shifts to be applied to the transmit and LO chirps are identified at step 508. This may include, for example, the controller 142 identifying a frequency shift $f_{Shift}$ that is much higher than the passband of the first-stage amplifier 128 or identifying a frequency shift $f_{Shift}$ such that $f_{Shift}-f_{IF\_center}$ is much higher than the passband of the first-stage amplifier 128.

A transmit beam containing transmit chirps is generated at step 510, and the transmit beam is directed towards the area or object of interest at step 512. This may include, for example, the master oscillator 102 generating MO laser light 104. This may also include the transmit modulator 106 modulating the MO laser light 104 based on the transmit modulation signal 144 from the controller 142 to generate the transmit laser light 108. This may further include the laser amplifier 110 amplifying the transmit laser light 108 to produce the amplified transmit laser light 112, which functions as the transmit beam 116. The transmit modulation signal 144 can control the transmit modulator 106 so that transmit chirps 404a-404b are generated in the transmit beam 116, where the transmit chirps 404a-404b vary in frequency between adjacent intervals 402 based on the identified frequency shift $f_{Shift}$.

LO laser light containing LO chirps is generated at step 514. This may include, for example, the LO modulator 122 modulating the MO laser light 104 based on the LO modulation signal 146 from the controller 142 to generate the LO laser light 120. The LO modulation signal 146 can control the LO modulator 122 so that LO chirps 406a-406b are generated in the LO laser light 120, where the LO chirps 406a-406b vary in frequency between adjacent intervals 402 based on the identified frequency shift $f_{Shift}$. As described above, the transmit chirps 404a-404b and the LO chirps 406a-406b can be frequency-shifted in an alternating manner, with one interval 402 having a higher-frequency transmit chirp 404a and a lower-frequency LO chirp 406a and the next interval 402 having a lower-frequency transmit chirp 404b and a higher-frequency LO chirp 406b.

A receive beam containing receive chirps from the area or object of interest and possibly backscattered chirps is received at step 516. This may include, for example, receiving the receive beam 118 containing receive chirps 416a-416b reflected from the area or object of interest. The receive beam 118 may also contain backscattered chirps 418a-418b. The receive beam and the LO laser light are mixed to generate an interference signal at step 518. This may include, for example, the LO laser light 120 coherently interfering with the receive beam 118 to produce the interference signal 123.

The interference signal is processed to identify information about the area or object of interest at step 520. This may include, for example, the optical detector 126 converting the interference signal 123 into an electrical signal and the first-stage amplifier 128 amplifying the electrical signal to generate the output electrical signal 130. This may also include the analog-to-digital converter 132 digitizing the electrical signal 130 and the signal processor 134 processing the digitized electrical signal. As examples, the signal processor 134 can perform various operations to identify one or more objects, generate images of one or more areas or objects, determine whether one or more objects are moving, or determine a velocity and direction of movement of at least one moving object.

Although FIG. 5 illustrates one example of a method 500 for reducing the impact of backscatter in a coherent LADAR system, various changes may be made to FIG. 5. For example, while shown as a series of steps, various steps in FIG. 5 may overlap, occur in parallel, occur in a different order, or occur any number of times. As particular examples, steps 510-520 may occur repeatedly using the same repetition interval and frequency shifts determined earlier (if those values are suitable for continued use), or steps 502-520 may occur repeatedly to refine the frequency offset, range, and round trip time and then update the repetition interval and frequency shifts. In addition, as described immediately below, the use of chirps is not required, and the transmit beam 116, receive beam 118, and LO laser light 120 can have other suitable frequencies.

It should be noted here that the use of "chirps" has been described above, where each chirp has a linearly-increasing or linearly-decreasing frequency. However, this disclosure is not limited to use with transmit, receive, and LO chirps, and each of these signals can have any other suitable frequencies. For example, there are other phase modulation schemes that can be used besides liner frequency modulation, such as schemes in which the frequency of each signal changes non-linearly in a given time period or changes both up and down (linearly or non-linearly) in a given time period. Also, it is possible for the transmit beam 116, receive beam 118, and/or LO laser light 120 to have a fixed frequency in each time period, where the fixed frequency differs in different time periods. In general, as long as the offsets in the frequencies of the transmit beam 116 (and therefore the receive beam 118) and LO laser light 120 can be varied, any suitable fixed or variable transmit, receive, and LO frequencies can be used here.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   generating a transmit beam in different intervals of time;
   directing the transmit beam towards an area or object of interest;
   receiving a receive beam that comprises the transmit beam as reflected from the area or object of interest;
   generating local oscillator (LO) laser light, wherein the transmit beam and the LO laser light are frequency-shifted such that the transmit beam has a higher frequency than the LO laser light in a first subset of the intervals and a lower frequency than the LO laser light in a second subset of the intervals; and
   processing the LO laser light and the receive beam to identify information about the area or object of interest.

2. The method of claim 1, further comprising:
   selecting a length of the intervals such that a round trip flight time of laser light to and from the area or object of interest divided by the length of the intervals is an odd integer.

3. The method of claim 1, wherein processing the LO laser light and the receive beam comprises:
   generating an interference signal based on the receive beam and the LO laser light;
   converting at least part of the interference signal into an electrical signal using an optical detector and an amplifier; and
   processing the electrical signal.

4. The method of claim 3, wherein the receive beam received in a specified interval is closer in frequency to the LO laser light in the specified interval and is farther away in frequency from the transmit beam in the specified interval.

5. The method of claim 4, wherein:
   the receive beam further contains backscattered light; and
   the backscattered light received in the specified interval matches or is closer in frequency to the transmit beam in the specified interval and is farther away in frequency from the LO laser light in the specified interval.

6. The method of claim 5, wherein:
   the receive beam and the LO laser light in the specified interval have a frequency offset within a passband of the amplifier; and
   the backscattered light and the LO laser light in the specified interval have a frequency offset above the passband of the amplifier.

7. The method of claim 3, wherein:
   the receive beam further contains backscattered light;
   the electrical signal includes at least one tone based on the backscattered light; and
   the at least one tone and any harmonics of the at least one tone are higher in frequency than a passband of the amplifier.

8. A system comprising:
   a laser source configured to generate a transmit beam in different intervals of time;
   a local oscillator (LO) source configured to generate LO laser light;
   optics configured to receive a receive beam that comprises the transmit beam as reflected from an area or object of interest; and
   a controller configured to control frequency-shifting of the transmit beam and the LO laser light such that the transmit beam has a higher frequency than the LO laser light in a first subset of the intervals and a lower frequency than the LO laser light in a second subset of the intervals.

9. The system of claim 8, wherein:
   the laser source comprises:
      a master oscillator (MO) configured to generate MO laser light;
      a first modulator configured to modulate the MO laser light and generate transmit laser light; and
      a laser amplifier configured to amplify the transmit laser light and generate the transmit beam;
   the LO source comprises a second modulator configured to modulate the MO laser light and generate the LO laser light; and
   the controller is configured to control the first and second modulators to control the frequency-shifting of the transmit beam and the LO laser light.

10. The system of claim 8, wherein the optics comprise a common aperture through which the transmit beam and the receive beam pass.

11. The system of claim 8, wherein the controller is configured to select a length of the intervals such that a round trip flight time of laser light to and from the area or object of interest divided by the length of the intervals is an odd integer.

12. The system of claim 8, wherein the controller is configured to control the frequency-shifting of the transmit beam and the LO laser light such that the receive beam in a specified interval is closer in frequency to the LO laser light in the specified interval and is farther away in frequency from the transmit beam in the specified interval.

13. The system of claim 12, wherein:
   the receive beam further contains backscattered light; and
   the controller is configured to control the frequency-shifting of the transmit beam and the LO laser light such that the backscattered light received in the specified interval matches or is closer in frequency to the transmit beam in the specified interval and is farther away in frequency from the LO laser light in the specified interval.

14. The system of claim 8, wherein:
the optics are further configured to generate an interference signal based on the receive beam and the LO laser light; and
the system further comprises an optical detector and an amplifier configured to convert at least part of the interference signal into an electrical signal.

15. The system of claim 14, wherein:
the receive beam further contains backscattered light;
the receive beam and the LO laser light in a specified interval have a frequency offset within a passband of the amplifier; and
the backscattered light and the LO laser light in the specified interval have a frequency offset above the passband of the amplifier.

16. The system of claim 14, wherein:
the receive beam further contains backscattered light;
the electrical signal includes at least one tone based on the backscattered light; and
the at least one tone and any harmonics of the at least one tone are higher in frequency than a passband of the amplifier.

17. A non-transitory computer readable medium containing instructions that when executed cause a controller to:
control generation, by a laser source, of a transmit beam that is transmitted towards an area or object of interest in different intervals of time;
control generation, by a local oscillator (LO) source, of LO laser light that is mixed with a receive beam, the receive beam comprising the transmit beam as reflected from the area or object of interest; and
frequency-shift the transmit beam and LO laser light such that the transmit beam has a higher frequency than the LO laser light in a first subset of the intervals and a lower frequency than the LO laser light in a second subset of the intervals.

18. The non-transitory computer readable medium of claim 17, wherein the instructions when executed further cause the controller to select a length of the intervals such that a round trip flight time of laser light to and from the area or object of interest divided by the length of the intervals is an odd integer.

19. The non-transitory computer readable medium of claim 17, wherein the instructions that when executed cause the controller to frequency-shift the transmit beam and the LO laser light comprise:
instructions that when executed cause the controller to frequency-shift the transmit beam and the LO laser light such that the receive beam in a specified interval is closer in frequency to the LO laser light in the specified interval and is farther away in frequency from the transmit beam in the specified interval.

20. The non-transitory computer readable medium of claim 17, wherein:
the receive beam further contains backscattered light; and
the instructions that when executed cause the controller to frequency-shift the transmit beam and the LO laser light further comprise:
instructions that when executed cause the controller to frequency-shift the transmit beam and the LO laser light such that the backscattered light received in a specified interval matches or is closer in frequency to the transmit beam in the specified interval and is farther away in frequency from the LO laser light in the specified interval.

\* \* \* \* \*